(12) United States Patent
Buryak et al.

(10) Patent No.: US 10,032,073 B1
(45) Date of Patent: Jul. 24, 2018

(54) DETECTING ASPECT RATIOS OF DOCUMENT PAGES ON SMARTPHONE PHOTOGRAPHS BY LEARNING CAMERA VIEW ANGLES

(71) Applicant: Evernote Corporation, Redwood City, CA (US)

(72) Inventors: Ilya Buryak, Moscow (RU); Eugene Livshitz, San Mateo, CA (US); Alexander Pashintsev, Cupertino, CA (US); Boris Gorbatov, Sunnyvale, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 15/191,800

(22) Filed: Jun. 24, 2016

Related U.S. Application Data

(60) Provisional application No. 62/184,453, filed on Jun. 25, 2015.

(51) Int. Cl.
*G06K 9/00* (2006.01)
*H04N 7/18* (2006.01)

(52) U.S. Cl.
CPC ......... *G06K 9/00463* (2013.01); *H04N 7/185* (2013.01)

(58) Field of Classification Search
CPC ........................... G06K 9/00463; H04N 7/185
See application file for complete search history.

(56) References Cited

U.S. PATENT DOCUMENTS

| 2004/0165786 A1* | 8/2004 | Zhang ...................... G06K 9/32 382/276 |
| 2006/0067588 A1* | 3/2006 | Makino ................ G06K 9/3241 382/276 |
| 2009/0225180 A1* | 9/2009 | Maruyama .............. G06T 5/006 348/222.1 |

OTHER PUBLICATIONS

Zhang, Zhengyou, and Li-wei He. "Whiteboard scanning and image enhancement." Microsoft Tech Report (2003).*

* cited by examiner

*Primary Examiner* — Bhavesh Mehta
*Assistant Examiner* — Menatoallah Youssef
(74) *Attorney, Agent, or Firm* — Morgan, Lewis & Bockius LLP

(57) ABSTRACT

Detecting an aspect ratio of an image captured with a smartphone includes detecting at least one convex quadrangle of arbitrary shape on the image and generating a plurality of additional convex quadrangles having vertices in a pre-determined vicinity of vertices of the quadrangle on the image. A linear projective mapping matrix is generated for mapping each of the quadrangle and the plurality of additional quadrangles onto a unit square. A plurality of estimated focal lengths of the camera of the smartphone is determined according to matrixes corresponding to the linear projective mappings onto a unit square of the quadrangle and each of the plurality of additional quadrangles. The quadrangle is used to determine the aspect ratio of the image in response to a range of the plurality of estimated focal lengths including a true value of the focal length of the camera of the smartphone.

20 Claims, 4 Drawing Sheets

DETECTING ASPECT RATIOS OF DOCUMENT PAGES ON SMARTPHONE PHOTOGRAPHS BY LEARNING CAMERA VIEW ANGLES

CROSS-REFERENCE TO RELATED APPLICATIONS

This application claims priority to U.S. Prov. App. No. 62/184,453, filed on Jun. 25, 2015, and entitled "DETECTING PAGE ASPECT RATIOS ON SMARTPHONE PHOTOGRAPHS BY LEARNING CAMERA VIEW ANGLES", which is incorporated herein by reference.

TECHNICAL FIELD

This application is directed to the field of image processing, and more particularly to the field of identifying aspect ratios of document pages on smartphone photographs.

BACKGROUND OF THE INVENTION

Mobile phones with digital cameras have long become ubiquitous. In 2014, worldwide smartphone sales surpassed, for the first time, one billion units. According to market statistics and forecasts, by 2018, annual smartphone shipments are expected to grow to 1.87 billion units. Over 80% of all mobile phones will be arriving to customers with embedded digital cameras. This will drive annual sales of phone cameras by worldwide vendors to mobile phone manufacturers, with the purpose of embedding the cameras into smartphones and feature phones, to 1.5 billion units.

Market research indicates that photographing with phone cameras has been the most popular activity of smartphone owners for many years in a row. Recent polls have shown that 82% of smartphone users are taking digital photographs, which exceeds the second most popular application, texting, which is used by 80% of smartphone owners. Market studies also revealed that about 27% of all photographs taken within a year have been captured with smartphones; additionally, the total count of images posted on social photo-sharing sites and taken with smartphones has exceeded the cumulative count for photographs taken with any type of non-smartphone equipment.

Hundreds of millions smartphone users are utilizing smartphone cameras in their business offices and homes. Because paper documents retain a significant role in the everyday information flow of both business users and households, the volumes of digitizing and capturing of paper based information with smartphone cameras are constantly increasing. This trend is facilitated in part by the arrival and advancements in multi-platform content management systems, such as the Evernote service and software developed by Evernote Corporation of Redwood City, Calif. Pages from books and magazines, printed newspaper articles, receipts, invoices, checks, tax and other forms, printed reports, business cards, handwritten notes and memos taken on legal pads, in specialized Moleskine notebooks, on sticky notes or easels, and other types of printed and handwritten documents are benefiting from digital capturing and storage in Evernote where advanced image search and various methods of organization of content items with embedded and attached images are available.

Specialized standalone and embedded applications have been developed, including Scannable software by Evernote Corporation and integrated Page Camera feature in the Evernote software, that may identify and automatically capture document pages from complex scenes, overcoming perspective and other types of image distortion, taking care of poor lighting conditions, varying camera view angles and other challenging circumstances. Advanced methods for robust retrieval of page boundaries provide a solid basis for subsequent image correction and processing.

Notwithstanding significant progress in pre-processing, correction and recognition of scenes captured with smartphone cameras, reliable detection of key parameters of captured documents, such as identification of base page formats from camera phone photographs, still present challenging tasks. In addition to a broad variety of available and standardized page formats in documents, such as ISO 216 and ANSI paper sizes, A-B-C series of page formats with national extensions, letter, ledger, legal, architectural and other specialized formats, there exists a spectrum of additional paper formats used in checks, receipts, stickers, cards, etc. Accurate identification of page aspect ratios from photographs may be further complicated by varying camera view angles and by different focal lengths of phone cameras, as well as by obstruction of page images by other objects in a scene, by damaged page images with uneven page borders (for example, when a user attempts to manually separate two checks from each other in a long band), and by other challenging characteristics of a capturing environment and process.

Accordingly, it is desirable to develop efficient methods and systems for detecting page aspect ratios on photographs of paper documents taken with smartphone cameras.

SUMMARY OF THE INVENTION

According to the system described herein, detecting an aspect ratio of an image captured with a smartphone includes detecting at least one convex quadrangle of arbitrary shape on the image, generating a plurality of additional convex quadrangles having vertices in a pre-determined vicinity of vertices of the at least one quadrangle on the image, generating a linear projective mapping matrix for mapping each of the at least one quadrangle and the plurality of additional quadrangles onto a unit square, determining a plurality of estimated focal lengths of the camera of the smartphone according to matrixes corresponding to the linear projective mappings onto a unit square of the at least one quadrangle and each of the plurality of additional quadrangles, and using the at least one quadrangle to determine the aspect ratio of the image in response to a range of the plurality of estimated focal lengths including a true value of the focal length of the camera of the smartphone. The image may be a still photo captured with the camera of the smartphone or a frame in a video flow captured with the camera of the smartphone. Each of the plurality of the estimated focal lengths of the camera may be determined using the formula:

$$C(Q) = \sqrt{\frac{H_{11} \cdot H_{12} + H_{21} \cdot H_{22}}{H_{31} \cdot H_{32}}},$$

where $H_{11}$, $H_{12}$, $H_{21}$, $H_{22}$, $H_{31}$, $H_{32}$, are all components of the linear projective mapping matrix. Two opposite vertices of the at least one quadrangle may be mapped onto two opposite corners of a new quadrangle having a predefined distance between the two opposite vertices and a predefined orientation of an interval connecting the two opposite vertices and four coordinates of two unmapped vertices of the new quadrangle may be used to determine the aspect ratio. The four coordinates of two unmapped vertices of the new quadrangle may be entered into a pre-built Support Vector Regression model which derives the aspect ratio. The pre-built Support Vector Regression model may be built by artificially generating a plurality of document pages that represent a broad range of aspect ratios and photographing each page with a smartphone camera from various meaningful view angles. Detecting an aspect ratio of an image captured with a smartphone may also include lowering resolution of images captured by the camera of the smartphone prior to detecting the at least one quadrangle. The pre-determined vicinity may depend upon the resolution of the images. The pre-determined vicinity may vary according to a tolerance level of acceptance of the estimate of the focal length of the camera. The tolerance level may be set by a user.

According further to the system described herein, a non-transitory computer-readable medium contains software that detects an aspect ratio of an image captured with a smartphone. The software includes executable code that detects at least one convex quadrangle of arbitrary shape on the image, executable code that generates a plurality of additional convex quadrangles having vertices in a pre-determined vicinity of vertices of the at least one quadrangle on the image, executable code that generates a linear projective mapping matrix for mapping each of the at least one quadrangle and the plurality of additional quadrangles onto a unit square, executable code that determines a plurality of estimated focal lengths of the camera of the smartphone according to matrixes corresponding to the linear projective mappings onto a unit square of the at least one quadrangle and each of the plurality of additional quadrangles, and executable code that uses the at least one quadrangle to determine the aspect ratio of the image in response to a range of the plurality of estimated focal lengths including a true value of the focal length of the camera of the smartphone. The image may be a still photo captured with the camera of the smartphone or a frame in a video flow captured with the camera of the smartphone. Each of the plurality of the estimated focal lengths of the camera may be determined using the formula:

$$C(Q) = \sqrt{\frac{H_{11} \cdot H_{12} + H_{21} \cdot H_{22}}{H_{31} \cdot H_{32}}},$$

where $H_{11}$, $H_{12}$, $H_{21}$, $H_{22}$, $H_{31}$, $H_{32}$, are all components of the linear projective mapping matrix. Two opposite vertices of the at least one quadrangle may be mapped onto two opposite corners of a new quadrangle having a predefined distance between the two opposite vertices and a predefined orientation of an interval connecting the two opposite vertices and four coordinates of two unmapped vertices of the new quadrangle may be used to determine the aspect ratio. The four coordinates of two unmapped vertices of the new quadrangle may be entered into a pre-built Support Vector Regression model which derives the aspect ratio. The pre-built Support Vector Regression model may be built by artificially generating a plurality of document pages that represent a broad range of aspect ratios and photographing each page with a smartphone camera from various meaningful view angles. The software also includes executable code that lowers resolution of images captured by the camera of the smartphone prior to detecting the at least one quadrangle. The pre-determined vicinity may depend upon the resolution of the images. The pre-determined vicinity may vary according to a tolerance level of acceptance of the estimate of the focal length of the camera. The tolerance level may be set by a user.

The proposed system obtains aspect ratios of pages detected as quads (convex quadrangles of arbitrary shape) within frames of video flow of a smartphone camera, such as a preview mode of the camera. The system verifies quad acceptance criteria based on a comparison of a range of calculated camera focal lengths for the quad and its randomized deviations with the true focal length of the camera; a pre-compiled SVR (Support Vector Regression) model of page aspect ratio is subsequently applied to accepted quads.

A challenge in detecting page aspect ratios from smartphone photographs is non-uniqueness of determining camera position and view angle from a photograph, even when a camera's focal length and other parameters are known to the system. Thus, there may be two different camera views of a document page where a page quad needs to be detected:

One horizontally shifted against a page median line;
Another centrally located against the page but turned at a certain angle around a horizontal axis parallel to the page median line.

Both possible views may produce precisely the same location of page corners on a still photograph or on a frame of the camera video stream.

In other words, there may be no exact solution to the task in the multi-dimensional space of all camera positions with respect to the page.

An observation leading to the system design is that, factually, the camera may not occupy all possible positions when a user takes photographs. Camera parameters, along with convenient ways of holding a camera, conventional wisdom of capturing photographs, and usage habits may significantly restrict camera configuration space. Thus, focal lengths of a camera for different models of smartphones change within a relatively narrow range, which restricts a class of projective transformations performed during scene capturing. Additionally, many users normally take document photos so that a current page occupies a significant portion of a frame and is viewed under a reasonable angle; this way of camera positioning is also encouraged by software applications (for example, by Evernote Page Camera feature). Taking into account the above-mentioned restrictions enable the present system to detect page aspect ratios from smartphone photographs with a practically acceptable accuracy.

Estimating aspect ratios may include several step listed below, some of which may be optional.

1. Compiling an SVR Model

This is performed prior to main (runtime) system functioning. Multiple pages are artificially generated in order to represent a broad range of aspect ratios. In an embodiment, page aspect ratios for artificial pages may vary from 1:1 to 10:1 with a step 0.1, i.e. 1:1, 1.1:1, 1.2:1 . . . 9.9:1, 10:1.

The artificially generated pages are photographed with a smartphone camera; each page is photographed from various meaningful view angles. A dedicated software utility detects quads corresponding to page corners and normalizes each quad by mapping two opposite corners onto a unit segment [0; 1], leaving four coordinates of the two free, unmapped, corners as SVR arguments.

After the corpus of photographs is processed, an SVR model is built using known methods; the SVR model ties a 4-component vector (x, y, u, v) (coordinates of two free vertices of a quad) to a quad's aspect ratio r.

The subsequent steps describe a runtime process served by the system, starting with retrieving a quad from a frame or video stream or a photograph and ending with determining quad's aspect ratio (or rejecting the quad as inconsistent).

2. Checking Quad Acceptance

Even though quads on newly captured real-life photographs may be generally subjected to the conditions used for compiling the SVR model, as explained elsewhere herein, there may be multiple reasons why a detected quad may still fail to represent a document page consistent with the model; thus, a page view object may be obstructed, multiple documents may be present in a scene (for example, a frame in a camera video flow) leading to an incorrect quad identification, the page may be damaged or excessively deformed, etc.

In order to check consistency of an identified quad with the assumptions of the model for calculating aspect ratios, the proposed system may employ a special acceptance/rejection mechanism, which functions as follows:

a. The system may build a three-dimensional matrix $H_{ij}$ $(i,j=1\ldots3)$ of a linear projective transformation H of the identified quad Q onto a unit square U, where the quad and the unit square are placed into a horizontal coordinate plane z=const in a 3-dimensional space (x, y, z).
 b. Subsequently, the focal length of a smartphone camera may be estimated using the formula:

$$C(Q) = \sqrt{\frac{H_{11} \cdot H_{12} + H_{21} \cdot H_{22}}{H_{31} \cdot H_{32}}}$$

c. Quad detection error may be estimated. The quad detection error may depend on quad identification methods, such as lowering camera resolution for faster calculations.
 d. Multiple random convex quads may be stochastically generated within the vicinity of the original quad; the vicinity may be defined by the quad detection error and a predefined (or user defined) tolerance level for quad acceptance. The corresponding projective transformations for random quads may be built as explained above; the corresponding values of focal length of a camera for the random quads may be estimated according to the above formula and are added to a range of estimated vales for the focal length.
 e. If the range of estimated values for the focal lengths covers the true value of the focal length (known to the system for a particular smartphone camera being used), the original quad may be accepted; otherwise, the original quad may be rejected.
 f. In some embodiments, a softer acceptance/rejection model may be used. In case of an initial rejection of a quad subject to steps a.-e. above, a vicinity of the original quad defined by the quad detection error and a tolerance level for quad acceptance may be broadened to take into account other factors of potential quad deformation; accordingly, steps c.-e. may be repeated for the enlarged area. In the event that the enlarged area shows consistency of a detected quad with the known focal length of the camera, the quad may be qualified as possibly fit (but not necessarily accepted).

3. Calculating Aspect Ratio

For accepted and possible quads, a mapping of two of the opposite corners thereof onto a unit interval may be performed, as explained elsewhere herein (see step 1 above), according to a layout of an SVR model. Coordinates of the two remaining free (unmapped) corners may be subsequently fed into the SVR model of step 1 to obtain a desired estimated value of the aspect ratio. Note that the mapping can be extended to an arbitrary target quadrangle (not necessarily with a unit interval between its opposite corners); a target quadrangle may have any predefined distance between corners thereof and an arbitrary orientation of a diagonal thereof, as long as the same target quadrangle is used in processing of artificially generated pages for the SVR model, as explained elsewhere herein.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for estimating an aspect ratio of document pages captured on smartphone photographs based on a Support Vector Regression (SVR) model pre-trained on sample pages; the estimate uses page quad identification as an adequate page image from the standpoint of camera view angle and position, which is verified by estimating focal lengths of the camera for the original quad and random disturbances of the original quad and comparing estimated focal lengths of the camera to the known true value of the focal length.

Figure 1:
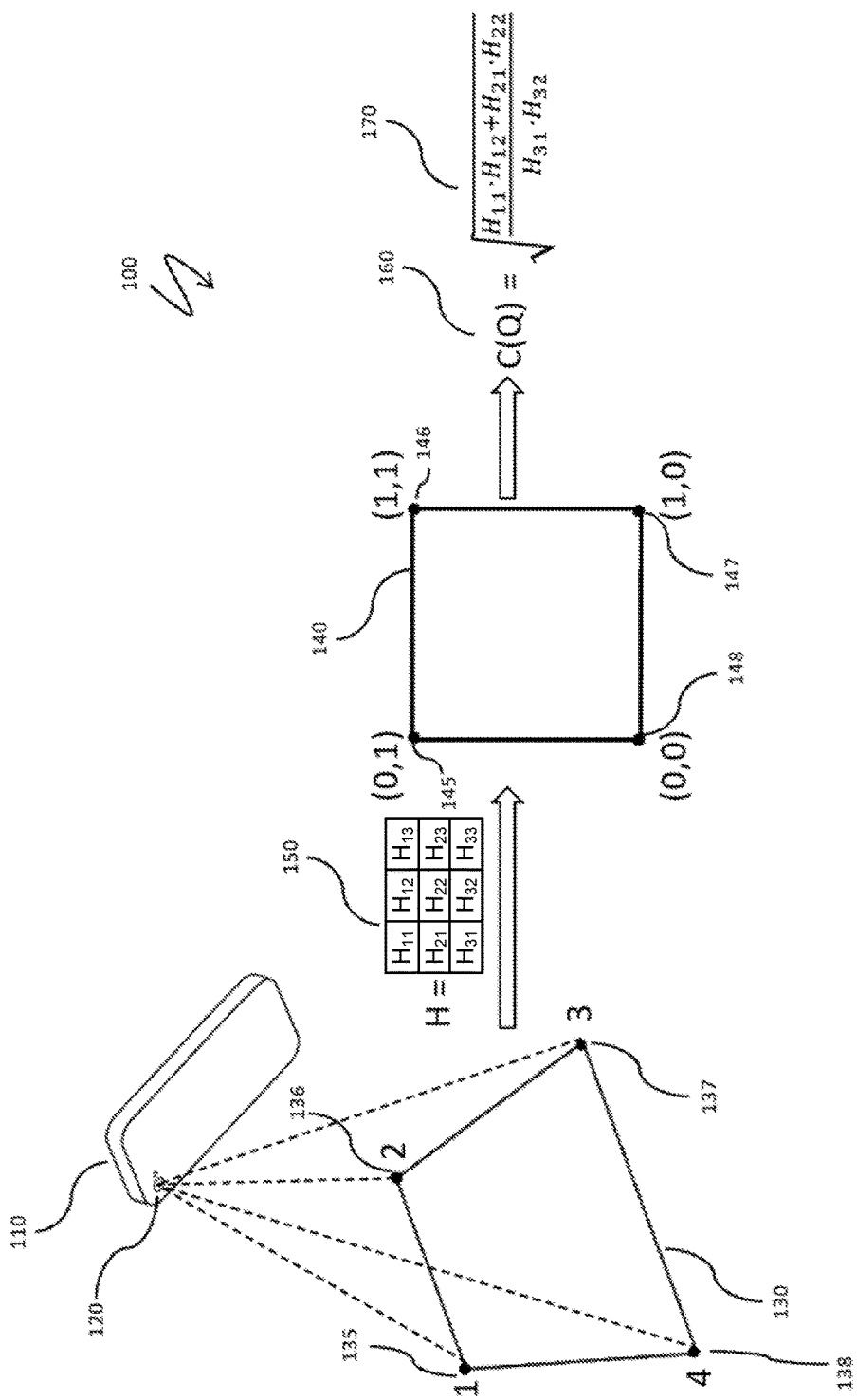
FIG. 1 is a schematic illustration of estimating a focal length of a camera based on a quad detected in a smartphone made photograph, according to an embodiment of the system described herein.

FIG. 1 is a schematic illustration 100 of estimating a focal length of a camera based on a quad detected in a smartphone made photograph. A smartphone 110 with a camera 120 has identified a quad 130 with corners (vertices) 135-138 in a still image or in a camera preview video flow (the rest of the scene content is not shown in FIG. 1). A matrix 150 of a linear projective mapping of the quad 130 onto a unit square 140 with corners 145-148 may be built by the system. Under such conditions, a focal length 160 of the camera may be estimated using a formula 170. A series of estimates following the procedure of FIG. 1 and explained elsewhere herein may be subsequently used to verify whether the quad captured with the camera satisfies assumptions of adequate position and view angle of the smartphone when capturing the scene.

Figure 2:
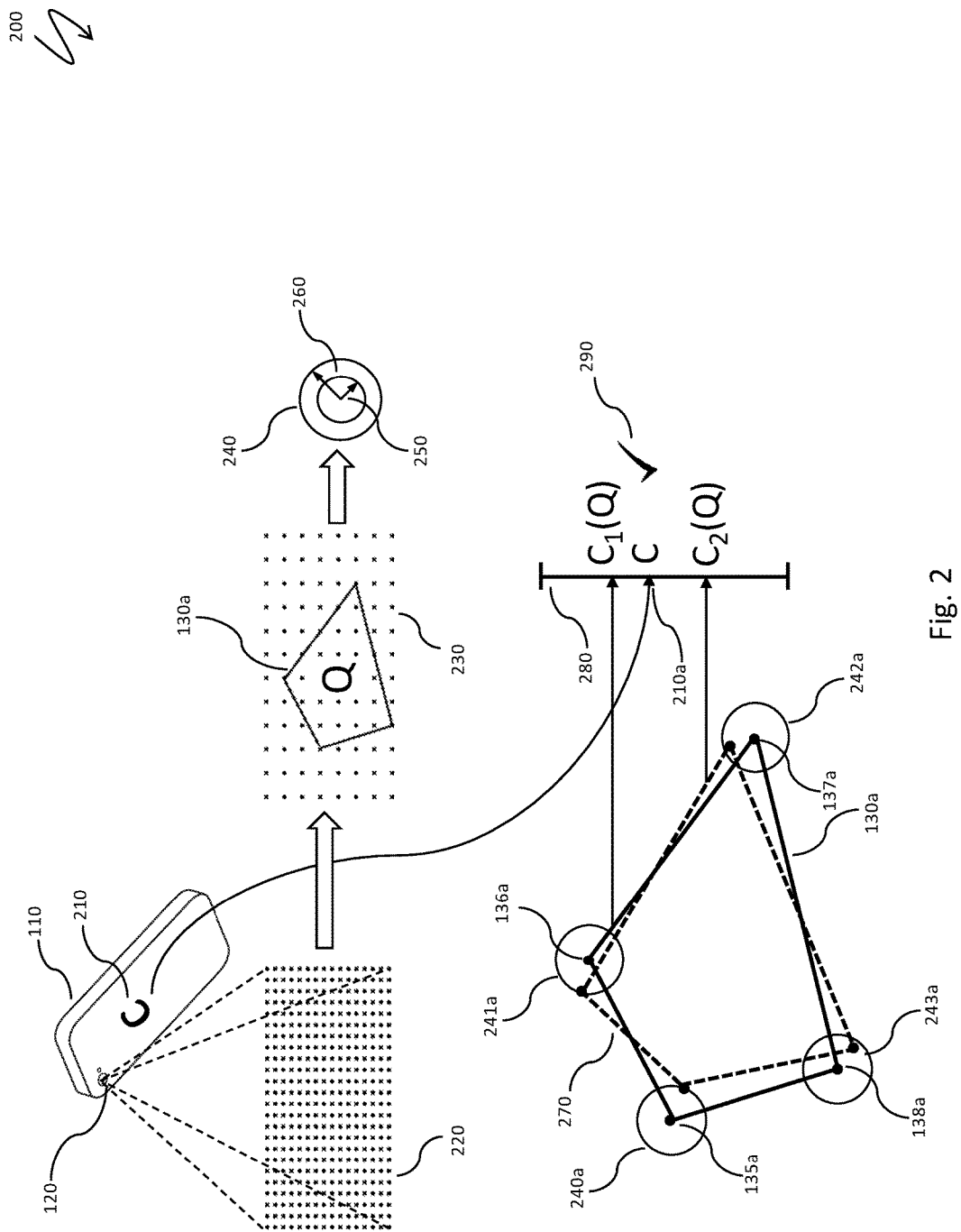
FIG. 2 is a schematic illustration of a quad acceptance process, according to an embodiment of the system described herein.

FIG. 2 is a schematic illustration 200 of a quad acceptance process. The smartphone 110 with the camera 120 has a true value of the focal length 210 (known to the system as, for example, a given parameter of the smartphone 110/camera 120). In order to speed up quad identification in a camera preview video flow (or on a still image), an original high-resolution video buffer 220 may be replaced with a lower resolution buffer 230 where an original quad 130a—an initial representation of a document page in a captured scene—may be detected faster than of a corresponding full hi-res image.

Subsequently, a full error of quad detection 240 may be represented as a combination of two components:
- a primary quad detection error 250, explained elsewhere herein (see in particular item c. of step 2 above), which may depend on a difference of quantization steps between the buffers 230 and 220 and on other factors;
- a tolerance level of quad acceptance 260, which may be predefined or customized by a user.

At a next step of the acceptance process, a vicinity of each vertex (corner) 135a-138a of the original quad 130a may be built as a plurality of circles 240a-243a, each representing a full error of quad detection. A random quad 270 with vertices within vicinities of vertices of the original quad 130a may be generated. A range of estimated focal lengths of the smartphone camera corresponding to capturing conditions and calculated using the formula 170 (of FIG. 1) may be created. In FIG. 2, estimates C(Q) of focal lengths for the original quad 130a ($C_1(Q)$) and for the random quad 270 ($C_2(Q)$) are shown within a full range 280 formed by focal length estimates for the original quad and for its multiple random disturbances. If the true value (C) of the camera focus length, i.e. the item 210a in FIG. 2 lies within the interval 280, the quad 130a may be accepted, as explained elsewhere herein and symbolically shown by a checkmark 290.

Figure 3:
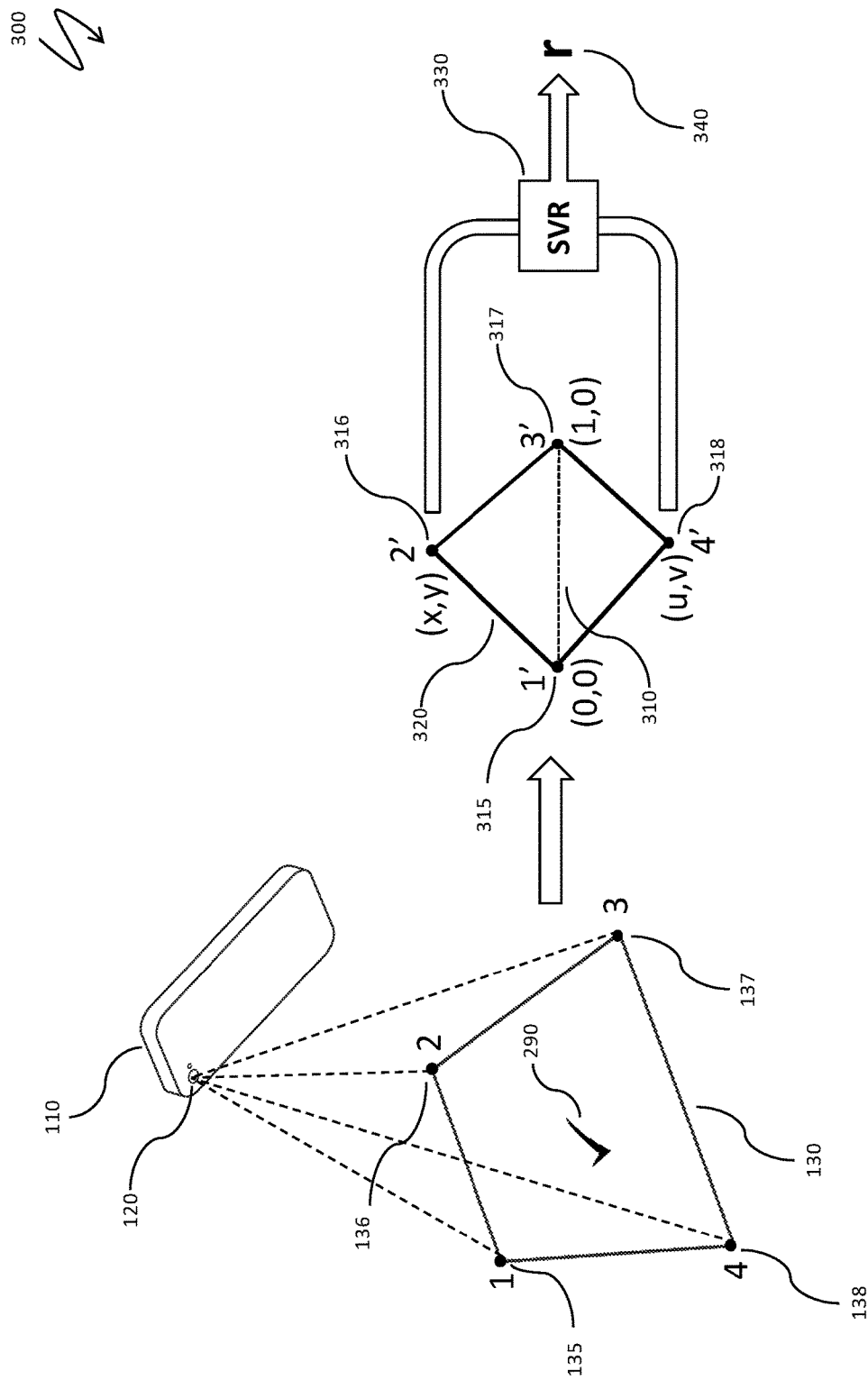
FIG. 3 schematically illustrates determining a quad aspect ratio, according to an embodiment of the system described herein.

FIG. 3 is a schematic illustration 300 of determining quad aspect ratio. The smartphone 110 with the camera 120 has identified the quad 130 with the vertices 135-138 in a still image or in a video flow of the camera 110. Here, the quad 130 has been accepted by the quad verification procedure (explained in FIG. 2, the accompanying text and elsewhere herein), as illustrated by the acceptance checkmark 290.

Under such assumption, two opposite vertices 135, 137 of the quad 130 are linearly mapped onto an origin 315 and an end 317 of a unit interval 310 with the vertices (0, 0), (1, 0) on an ideal plane. Linear mapping converts the original quad 130 into a quad 320. Subsequently, two other opposite vertices 316, 318, with coordinates (x, y), (u, v) form a quadruple (x, y, u, v), an input to an SVR model 330 trained in accordance with the method explained elsewhere herein (see step 1 above). In response to the inputs 316, 318, the SVR yields an estimate 340 for a page aspect ratio, r.

Figure 4:
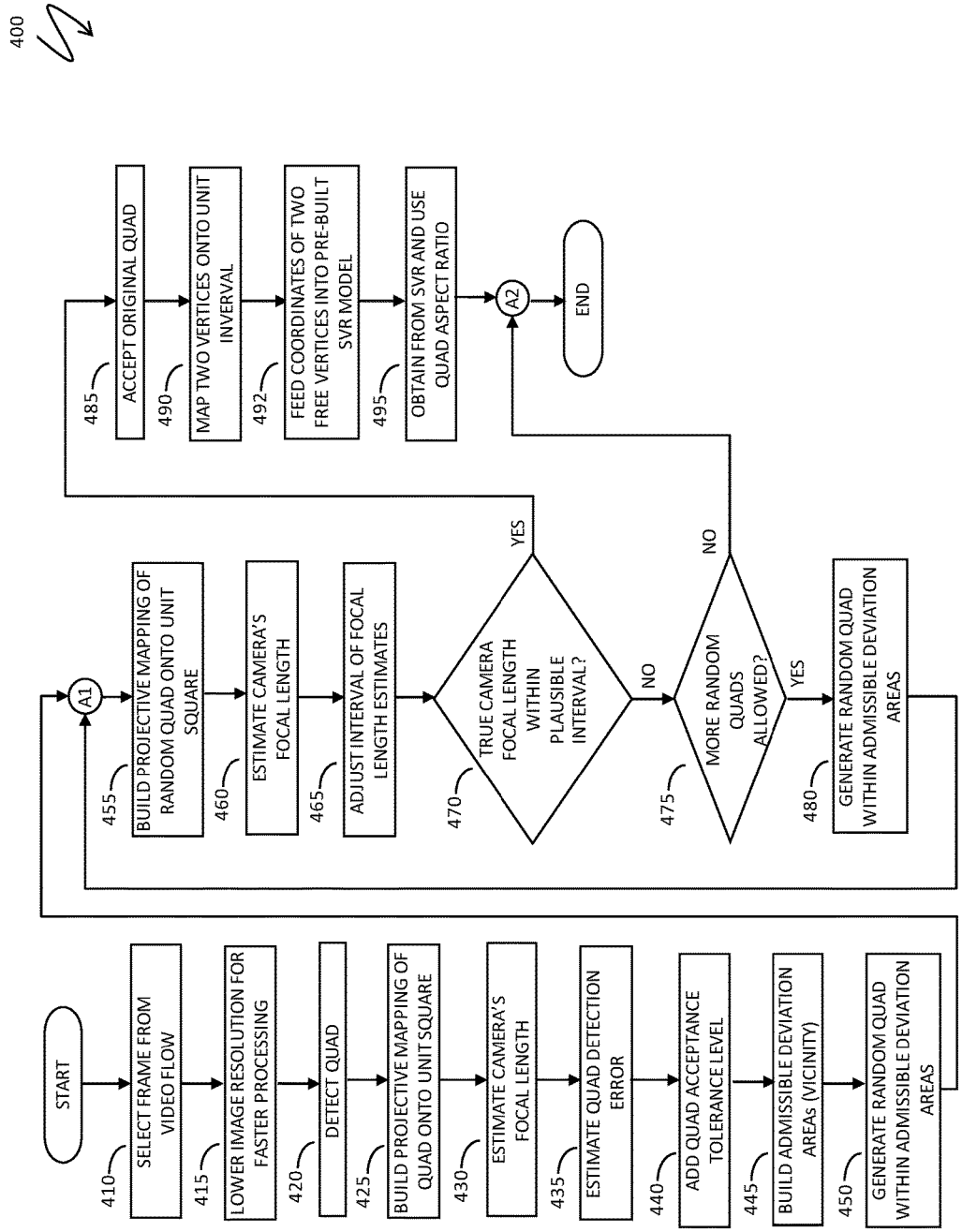
FIG. 4 is a system flow diagram illustrating system functioning, according to an embodiment of the system described herein.

Referring to FIG. 4, a system flow diagram 400 illustrates processing in connection with determining an aspect ratio. Processing begins at a step 410, where the system selects a frame (scene) from a camera preview video flow. After the step 410, processing proceeds to a step 415, where the system lowers image resolution for faster processing, as explained elsewhere herein (see, in particular, FIG. 2, items 220, 230 and the accompanying text). After the step 415, processing proceeds to a step 420, where the system detects an original quad (a boundary of a document page) in the frame. After the step 420, processing proceeds to a step 425, where the system builds a projective linear mapping of the quad onto a unit square, as explained elsewhere herein (see, for example, FIG. 1, item 150 and the accompanying text). After the step 425, processing proceeds to a step 430, where the matrix elements of the projective mapping are used to estimate focal length of a camera used to obtain the image (using, for example, the formula 170 in FIG. 1).

After the step 430, processing proceeds to a step 435, where the system estimates a quad detection error, as explained elsewhere herein. After the step 435, processing proceeds to a step 440, where a quad acceptance tolerance level is added to form a full error and a radius of the deviation circle (see, for example, item 240 in FIG. 2). After the step 440, processing proceeds to a step 445, where the system builds vicinities (admissible deviation areas) around vertices of the original quad (see, for example, item 240a in FIG. 2 and the accompanying text). After the step 445, processing proceeds to a step 450, where the system generates a random quad with having vertices within admissible deviation areas. After the step 450, processing proceeds to a step 455, where the system builds a projective mapping of the just generated random quad. After the step 455, processing proceeds to a step 460, where a focal length of the camera is estimated. The steps 455, 460 performed for a latest random quad are similar to the steps 425, 430 for an originally detected quad. After the step 460, processing proceeds to a step 465, where a newly estimated value of the focal length of the camera is added to previous values and an interval (range) of focal lengths is adjusted. After the step 465, processing proceeds to a test step 470, where it is determined whether a true (known) value of the focal length of the camera is in the current range of estimated focal lengths (see items 210a, 280 in FIG. 2 and the accompanying text). If not, then processing proceeds to a text step 475, where it is determined whether more random quads within the admissible deviation areas are allowed. If not, processing is complete without detection of the quad aspect ratio (the original quad is rejected). Otherwise, processing proceeds to a step 480 where a new random quad within the admissible deviation areas is generated.

After the step 480, processing proceeds back to the step 455 for processing the new random quad. If it was determined at the test step 470 that the true camera focal length is within the range of focal length estimates, processing proceeds to a step 485 where the original quad is accepted (see FIG. 2 and the accompanying text for details). After the step 485, processing proceeds to a step 490, where two opposite vertices of the original quad are mapped onto a unit interval, as explained elsewhere herein (see, for example, FIG. 3 and the accompanying text). After the step 490, processing proceeds to a step 492, where four coordinates of two free (unmapped) vertices of the quad are entered into a pre-built SVR model which derives a quad aspect ratio from the coordinates (see, for example, step 1 and FIG. 3 for details). After the step 492, processing proceeds to a step 495, where the SVR model returns the quad aspect ratio for subsequent use. After the step 495, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. A smartphone functioning as an image capturing device may include software that is pre-loaded with the device, installed from an app store, installed from a desktop (after possibly being pre-loaded thereon), installed from media such as a CD, DVD, etc., and/or downloaded from a Web site. Such smartphone may use an operating system selected from the group consisting of: iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of correcting image distortion, the method comprising:
    storing an image of a physical object captured by a device that includes a camera;
    analyzing the image to detect at least one convex quadrangle of arbitrary shape within the image;
    generating a plurality of additional convex quadrangles, wherein a respective vertex of a respective additional convex quadrangle is in a pre-determined vicinity of a corresponding vertex of the at least one convex quadrangle within the image;
    generating a plurality of linear projective mapping matrixes, including, for each of the at least one convex quadrangle and the plurality of additional convex quadrangles, generating a respective linear projective mapping matrix;
    using the plurality of linear projective mapping matrixes to map each of the at least one convex quadrangle and the plurality of additional convex quadrangles onto a unit square;
    determining a plurality of estimated focal lengths of the camera using the mappings of the plurality of linear projective mapping matrixes onto the unit square;
    using the at least one convex quadrangle to determine the aspect ratio of the image in response to a range of the plurality of estimated focal lengths including a true value of the focal length of the camera; and
    correcting distortion of the image using the determined aspect ratio.

2. A method, according to claim 1, wherein the image is one of: a still photo captured with the camera of the device or a frame in a video flow captured with the camera of the device.

3. A method, according to claim 1, wherein each of the plurality of the estimated focal lengths of the camera is determined using the formula:

$$C(Q) = \sqrt{\frac{H_{11} \cdot H_{12} + H_{21} \cdot H_{22}}{H_{31} \cdot H_{32}}}$$

where $H_{11}, H_{12}, H_{21}, H_{22}, H_{31}, H_{32}$, are all components of the linear projective mapping matrix.

4. A method, according to claim 1, wherein two opposite vertices of the at least one convex quadrangle are mapped onto two opposite corners of a new quadrangle having a predefined distance between the two opposite vertices and a predefined orientation of an interval connecting the two opposite vertices and wherein four coordinates of two unmapped vertices of the new quadrangle are used to determine the aspect ratio.

5. A method, according to claim 4, wherein the four coordinates of two unmapped vertices of the new quadrangle are entered into a pre-built Support Vector Regression model which derives the aspect ratio.

6. A method, according to claim 5, wherein the pre-built Support Vector Regression model is built by:
    artificially generating a plurality of document pages that represent a range of aspect ratios; and
    capturing images of each document page of the plurality of document pages from a plurality of view angles.

7. A method, according to claim 1, further comprising:
    lowering resolution of the image prior to detecting the at least one convex quadrangle.

8. A method, according to claim 7, wherein the pre-determined vicinity depends upon the lowered resolution of the image.

9. A method, according to claim 1, wherein the pre-determined vicinity varies according to a tolerance level of acceptance of the plurality of estimated focal lengths of the camera.

10. A method, according to claim 9, wherein the tolerance level is set by a user.

11. A non-transitory computer-readable medium containing software that corrects image distortion, the software comprising:
    executable code that stores an image of a physical object captured by a device that includes a camera;
    executable code that analyzes the image to detect at least one convex quadrangle of arbitrary shape within the image;
    executable code that generates a plurality of additional convex quadrangles, wherein a respective vertex of a respective additional convex quadrangle is in a pre-determined vicinity of a corresponding vertex of the at least one convex quadrangle within the image;
    executable code that generates a plurality of linear projective mapping matrixes, including, for each of the at least one convex quadrangle and the plurality of additional convex quadrangles, generating a respective linear projective mapping matrix;
    executable code that uses the plurality of linear projective mapping matrixes to map each of the at least one convex quadrangle and the plurality of additional convex quadrangles onto a unit square;
    executable code that determines a plurality of estimated focal lengths of the camera using the mappings of the plurality of linear projective mapping matrixes onto the unit square;
    executable code that uses the at least one convex quadrangle to determine the aspect ratio of the image in response to a range of the plurality of estimated focal lengths including a true value of the focal length of the camera; and
    correcting distortion of the image using the determined aspect ratio.

12. A non-transitory computer-readable medium, according to claim 11, wherein the image is one of: a still photo captured with the camera of the device or a frame in a video flow captured with the camera of the device.

13. A non-transitory computer-readable medium, according to claim 11, wherein each of the plurality of the estimated focal lengths of the camera is determined using the formula:

$$C(Q) = \sqrt{\frac{H_{11} \cdot H_{12} + H_{21} \cdot H_{22}}{H_{31} \cdot H_{32}}}$$

where $H_{11}$, $H_{12}$, $H_{21}$, $H_{22}$, $H_{31}$, $H_{32}$, are all components of the linear projective mapping matrix.

14. A non-transitory computer-readable medium, according to claim 11, wherein two opposite vertices of the at least one convex quadrangle are mapped onto two opposite corners of a new quadrangle having a predefined distance between the two opposite vertices and a predefined orientation of an interval connecting the two opposite vertices and wherein four coordinates of two unmapped vertices of the new quadrangle are used to determine the aspect ratio.

15. A non-transitory computer-readable medium, according to claim 14, wherein the four coordinates of two unmapped vertices of the new quadrangle are entered into a pre-built Support Vector Regression model which derives the aspect ratio.

16. A non-transitory computer-readable medium, according to claim 15, wherein the pre-built Support Vector Regression model is built by:
artificially generating a plurality of document pages that represent a range of aspect ratios; and
capturing images of each document page of the plurality of document pages from a plurality of view angles.

17. A non-transitory computer-readable medium, according to claim 11, further comprising: executable code that lowers resolution of the image prior to detecting the at least one convex quadrangle.

18. A non-transitory computer-readable medium, according to claim 17, wherein the predetermined vicinity depends upon the lowered resolution of the image.

19. A non-transitory computer-readable medium, according to claim 11, wherein the predetermined vicinity varies according to a tolerance level of acceptance of the plurality of estimated focal lengths of the camera.

20. A non-transitory computer-readable medium, according to claim 19, wherein the tolerance level is set by a user.

\* \* \* \* \*